S. HICKOK.
Refrigerator.
No. 22,871.
Patented Feb. 8, 1859.
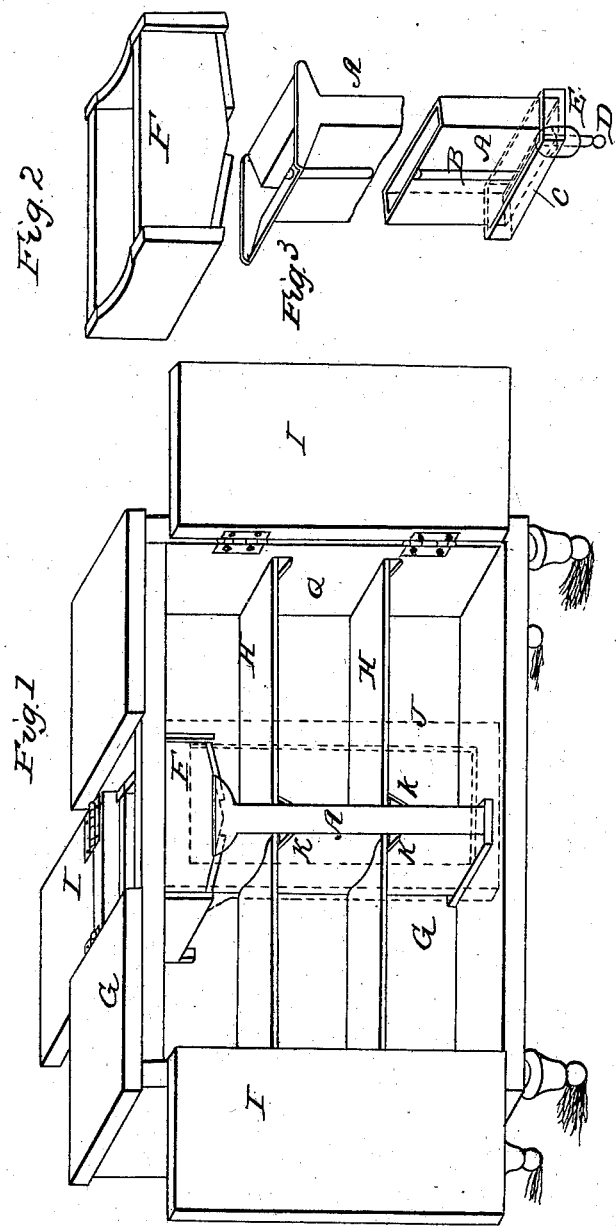

UNITED STATES PATENT OFFICE.

SAMUEL HICKOK, OF BUFFALO, NEW YORK.

REFRIGERATOR.

Specification of Letters Patent No. 22,871, dated February 8, 1859.

*To all whom it may concern:*

Be it known that I, SAMUEL HICKOK, of the city of Buffalo, in the county of Erie and State of New York, have invented certain new and useful Improvements in Refrigerators; and I do hereby declare that the following is a full and exact description thereof, reference being had to the accompanying drawings and the letters of reference marked thereon.

The nature of my invention relates to the construction and use of a cold water tank and tube, as shown, for receiving, holding and distributing into each apartment of the case, a stratum of cold water, in the manner and for the purposes herein set forth.

Figure I is a perspective of my improved refrigerator, its doors being thrown open. Fig. II is a perspective of the ice box. Fig. III is a perspective of the cold water tank which catches and holds the water which drips from the ice. It is represented as broken transversely.

A, (Fig. III) represents a tank made of zinc or other suitable material. It is made flaring at the top, so as to conveniently catch the water as it drips from the melting ice. It is made quite thin (say from one half to two inches) so, as to hold but a small quantity of water and in width equals the inside width of the case and in height, extends from the bottom of the case (inside) up to the ice box. This is placed in the middle of the case, as represented in Fig. I. Ribs are raised on the sides to support the ends of the shelves as shown at $k, k$.

B is a tube for conducting off into the trough or pan below the surplus water which rises to the top of the tank.

C is a trough or pan for catching the surplus water which flows from the tube B, and also the moisture which collects or condenses on the outside of the tank.

D is a tube projecting through the bottom of the case for the purpose of discharging the water from the tank (A).

E is a tube for discharging the water from the pan (C); F, ice box; G, G, G, case, made of wood; H H H, shelves; I I I, doors; J, dotted lines to represent a stile between the doors; K, ribs on the sides of the tank to hold the ends of the shelves.

Operation: The ice box is filled with ice. As it melts, the water runs down and fills the tank, or the tank may in the first place be filled with cold water from the well. As the temperature of the water in the tank changes, its warmer particles will rise to the top, and flow off through the tube B. The cold particles of water which drip from the ice, fall to the bottom of the tank, and hence there is a constant circulation of the water to wit, a current of cold water from the ice passing down, and a current of warmer water rising and passing off through the tube B. The water in the tank is thus kept quite cold. Whatever moisture there may be in the inside of the case, will be condensed on the sides of the tank and run down into the pan (C) and the inside of the case will be kept very cool and dry.

I thus secure all the advantages of the ice within the case, and the additional advantages of a body of cold water, with a cooling and condensing surface in each apartment. A similar tank may be used in the back part of the case if desired, and thus increase the amount of cold surface.

I claim—

The combination of the tube B, arranged as shown with the tank A, when combined with the case (G G G) for the purposes and substantially as herein described.

SAML. HICKOK.

Witnesses:
E. B. FORBUSH,
W. H. FORBUSH.